United States Patent
Hoffmann

(10) Patent No.: US 6,960,324 B1
(45) Date of Patent: Nov. 1, 2005

(54) CAP ASPIRATING SYSTEM

(75) Inventor: Uwe Hoffmann, Olfen (DE)

(73) Assignee: Olympus Diagnostica GmbH, Hamburg (DE)

( * ) Notice: Subject to any disclaimer, the term of this patent is extended or adjusted under 35 U.S.C. 154(b) by 0 days.

(21) Appl. No.: 09/936,871

(22) PCT Filed: Mar. 8, 2000

(86) PCT No.: PCT/EP00/01988

§ 371 (c)(1),
(2), (4) Date: Sep. 12, 2001

(87) PCT Pub. No.: WO00/55076

PCT Pub. Date: Sep. 21, 2000

(30) Foreign Application Priority Data

Mar. 15, 1999 (DE) .......................................... 199 11 349

(51) Int. Cl.$^7$ ................................................. B01L 9/00
(52) U.S. Cl. ........................ 422/104; 422/99; 422/102; 436/54; 436/177
(58) Field of Search ........................... 422/63, 99, 104; 436/43, 47, 48, 54, 174

(56) References Cited

U.S. PATENT DOCUMENTS

| | | | | |
|---|---|---|---|---|
| 3,824,745 A | * | 7/1974 | Hutchins | 451/359 |
| 3,844,896 A | * | 10/1974 | Sharpe | 435/286.4 |
| 3,973,935 A | * | 8/1976 | Moore et al. | 55/302 |
| 4,377,331 A | * | 3/1983 | Seelenbinder et al. | 396/579 |
| 4,515,286 A | * | 5/1985 | Ushikubo | 220/314 |
| 4,947,903 A | * | 8/1990 | Beckwith | 141/67 |
| 5,178,196 A | * | 1/1993 | Garacci | 141/67 |
| 5,323,819 A | * | 6/1994 | Shade | 141/65 |
| 5,525,298 A | * | 6/1996 | Anami | 422/63 |
| 6,615,441 B2 | * | 9/2003 | Yamaguchi | 15/302 |

* cited by examiner

Primary Examiner—Jill Warden
Assistant Examiner—Dwayne K Handy
(74) Attorney, Agent, or Firm—Rankin, Hill, Porter & Clark LLP

(57) ABSTRACT

An aspirating system for caps of sample containers including a suction duct, a partial-vacuum space formed by a collecting container, and a blower. The blower, when operated, produces a partial vacuum in the collecting container. The container is fitted at its lower side with a closing device.

5 Claims, 1 Drawing Sheet

CAP ASPIRATING SYSTEM

BACKGROUND OF THE INVENTION

The present invention relates to an aspirating system for caps of sample containers. Such aspirating systems illustratively are used in automated apparatus opening blood sample containers. Blood samples or other body fluids to be analyzed are, in general, contained in glass or plastic tubes sealed by a rubber stop or a screw cap. These sample containers are placed in a conveyor chain and are individually-opened by a gripper, which simultaneously exerts a rotating and pulling motion. The sealing cap/stopper removed in this manner from the sample container is aspirated away and put into a collecting container. The suction system provided for this purpose is substantially the same in concept as industrial suction systems known as vacuum cleaners where a blower is mounted on a reservoir and the suction hookup is connected to the opening device. A blood sample handling system of this kind is known from the German patent document DE 195 17 439.9.

Also, suction systems operating with compressed-air injectors are known for the same purpose. On one hand, such an apparatus requires large quantities of compressed air and, on the other hand, all the compressed air must be filtered to remove aerosols from it Accordingly, equipment costs and scope are very extensive.

The pertinent state of the art incurs the drawback that, on one hand, its suction systems are bulky and, because of the high motor power, also relatively loud and, on the other hand, and precisely with respect to blood samples and other medical samples, filtering can be carried out only insufficiently. Lastly, the known practical suction systems incur the difficulty that the entire collecting container, which at the same time also supports the blower, must be removed from the apparatus when being emptied, as a result of which the serial, automated opening procedure must be interrupted.

SUMMARY OF THE INVENTION

Accordingly, it is an objective of the present invention to create a suction system operating at comparatively low power, allowing adequate filtration of the suction air, and offering automated emptying of the collecting container.

The present invention provides a collecting container that is fitted with a closing device at its lower side. Opening the closing device allows emptying of the material collected therein, which are caps that were screwed and/or pulled off. Advantageously with respect to simple design and reliable operation, the closing device is in the form of a flap. When such a flap constitutes at least part of the base of the collecting container, a large cross-sectional aperture of the collecting container will have been attained.

An especially simple and operationally reliable design is attained in that the closing device includes a substantially horizontal pivot shaft and in that a counterweight dimensioned relative to the pivot shaft is provided. The counterweight keeps the closing device closed, or nearly so, even in the absence of a partial vacuum. Preferably, during operation the closing device is directly loaded with caps of sample containers and is kept closed by the partial vacuum. When partial vacuum is eliminated, the sealing system will pivot under the weight of one or more caps into an open position. Emptying of the collecting container is especially well reproducible if the device constitutes a chute in its open position, in particular in the zone of the base wall, the caps then drop by their own weight.

Advantageously, the blower is a centrifugal blower to provide low power consumption and low noise with good suction resulting in high partial vacuum at small suction cross-sections and, hence, high flows in the suction duct. In particular as regards medical purposes, the apparatus shall be advantageously fitted with a filter which, for a particle size of 0.2 $\mu$m, will filter at a rate of about 95%. For simplified maintenance, this filter may be a filter cartridge mounted at the blower's suction side.

With regard to a method to implement the apparatus, advantageously the blower shall be turned off to empty the collecting container, whereupon the closing device weighed down by the caps pivots into the open position. The caps then drop or fall from the closing device, which thereafter is rotated by the counterweight into a position at least almost closed again. Accordingly, with the present invention emptying can be implemented merely by shutting off the blower. If, following emptying, the blower again is turned on, the closing device is moved on account of the partial vacuum into its closed position. Accordingly, the system of the invention again is operational upon switching on the blower, and the partial vacuum assures that the closing device will be closed.

A particular advantageous application of the apparatus of the present invention is as part of an automated opening apparatus for human or animal liquid samples.

BRIEF DESCRIPTION OF THE DRAWING

An embodiment of the present invention is discussed below in relation to the drawing wherein.

DETAILED DESCRIPTION OF THE PREFERRED EMBODIMENT

Figure 1:
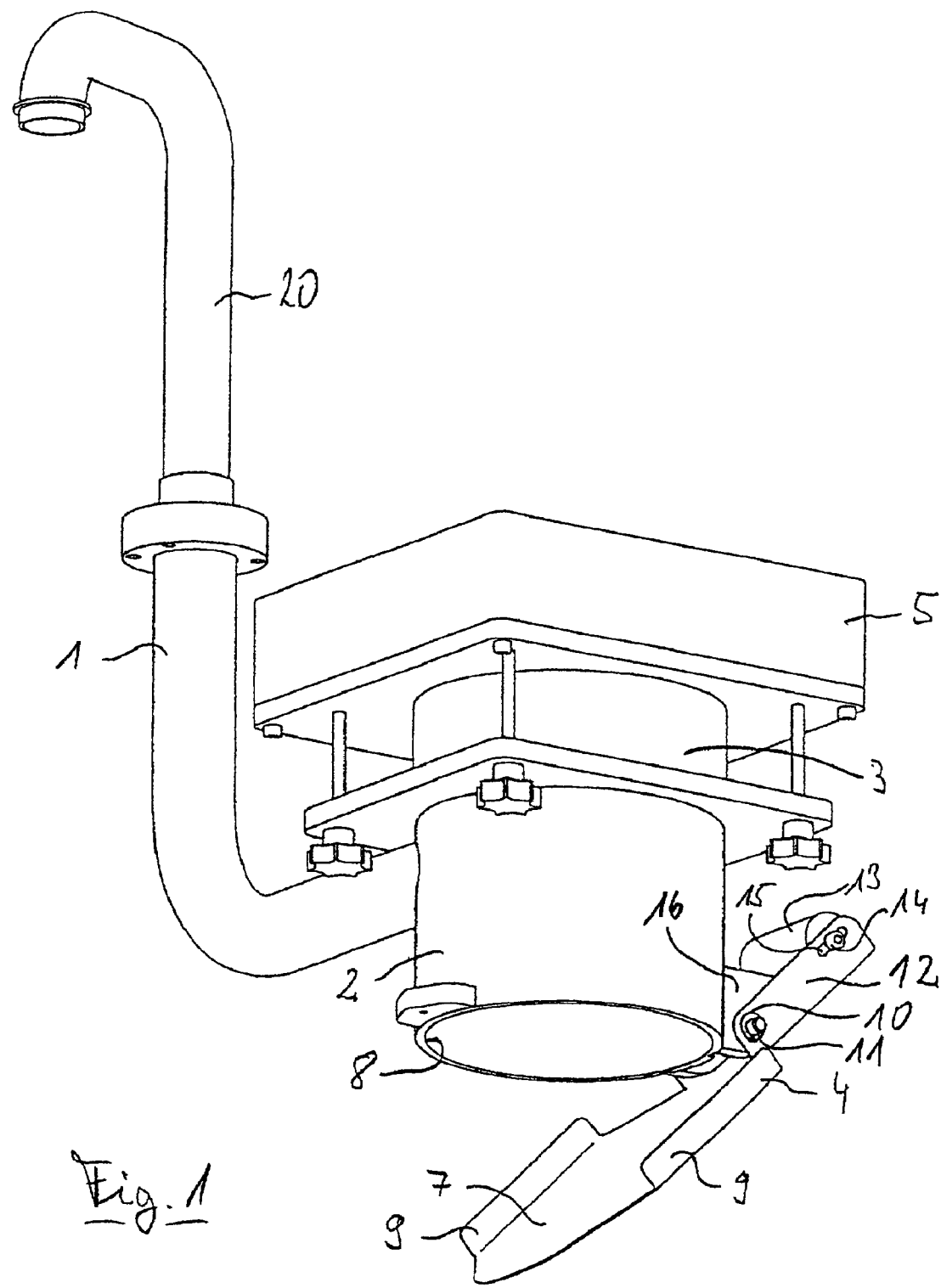
FIG. 1 is a perspective of a suction system according to the present invention.

FIG. 1 is a perspective view, as seen obliquely from below, of the suction system of the invention in its installed configuration. As shown in FIG. 1, the suction system of the invention fitted with a suction duct 1 which issues into a collecting container 2. The collecting container 2 supports, at its top side, a filter cartridge 3 and, at its bottom side, a closing flap 4 that simultaneously constitutes the collecting container's base wall. A centrifugal blower 5 is mounted at the top of the filter cartridge 3, and accordingly the already filtered exhaust air is fed to the blower 5.

The closing flap 4 (shown in its open state in FIG. 1) comprises a flat side 7 able to fully cover a lower aperture 8 of the collecting container 2. The flat side 7 is bounded at two mutually opposite sides by guide elements 9 which run perpendicularly to the flat side 7. Moreover, the closing device 4 comprises a support 10 receiving a pivot shaft 11 mounted in the region of a U-shaped segment 12.

The U-shaped segment 12 also supports a counterweight 13 situated at the end zone of the U-shaped segment 12, which is away from the flat side 7. The counterweight 13 is displaceably affixed in longitudinal slots 15 by means of tightening screws 14. The pivot shaft 11, in turn, is mounted into extensions 16 of the collecting container 2. As a result, the closing device 4 is pivotally mounted at a given position on the collecting container 2. In practice, the above described suction system may be integrated, for instance, into an automated sample handling apparatus for the purpose of automatically opening blood samples or other sample containers. In this design, the suction duct passes through a tube 20 to a means for taking off the caps. The remaining suction system is mounted such that the filter cartridge 3 shall be installed underneath the base plate of the sample handling apparatus and, moreover, space shall be provided underneath the collecting container 2 to receive a waste receptacle or bag.

The system described so far operates as follows:

The counterweight 13 of the closing device 4 is adjusted such that, when the device is at rest, (i.e., when the blower is shut off), and the collecting container 2 is devoid of caps, the flap 4 shall very nearly or entirely close the aperture 8. Thereupon, the blower 5 is activated and generates a partial vacuum in the collecting container 2 and causes the flat side 7 to be drawn against the aperture 8 and reliably retained there. The blower's suction side communicates with the suction duct 1 and the tube 20 which, in turn, issues into means opening the sealing caps (not shown). Because the filtering cartridge 3 is connected to the suction side of the blower 5, the entire aerosol-charged space will be subjected during operation to a partial vacuum and, as a result, any leaks may entail an intake of secondary air, but will not release aerosols. The pressure side of the blower 5 issues into the ambient. A waste receptacle of appropriate size is placed underneath the suction device.

A sample container cap screwed or pulled off in the vicinity of the tube 20 is thereupon released by the aperture device and aspirated by the airflow into the tube 20. From there, the cap passes through the tangentially connected suction duct 1 and into the collecting container 2 in which, because of the increasing cross-section, the aspirated air slows, and the cap/stopper drops in the direction of gravity onto the flat side 7 of the closing device 4. For the time being, the cap will stay there. In the case of consecutive opening of sample containers, the next arriving cap will also drop on the flat side 7. Any aerosols aspirated together with the air and released from the sample or adhering to the sealing cap/stopper are guided into the filtration cartridge 3 and are effectively retained therein. With respect to medical samples, preferably a filter retaining at least 95% at a particle size of 0.2 $\mu$m shall be selected. Thereupon, the exhaust air can be expelled into the lab without entailing reservations.

After a number of opening procedures, the screwed or pulled off caps will almost entirely fill the collecting container 2. The control of the automated sample handling apparatus then switches off the blower 5 for a given time interval and, as a result, the partial vacuum in the collecting container 2 will become less. The weight of the stoppers acting on the flat side 7 of the closing device 4 causes the closing device to pivot into the open position shown in FIG. 1. As such, the flat side 7 and the guide elements 9 constitute a chute for the sealing caps and from which they drop into the waste receptacle. After the collecting container 2 has been emptied, the counterweight 13 restores the closing device 4 to its closed position, which is reinforced by re-establishment of the partial vacuum when the blower 5 is again switched on. Thereupon, the system is ready to process further caps.

The power interruption to the blower 5 for the purpose of emptying the collecting container 2 may be comparatively short, for instance 5 to 10 seconds. Such a time interval is admissible in the course of typical sample handling of blood or the like and will not interrupt regular analysis because the sample tubes or containers drop into pallets and, following a given number of opened sample containers, the pallet will have to be changed. The size of the collecting container 2 may be matched to the size and number of sealing stoppers accumulating at one pallet and, as a result, the caps of a full pallet will fit into the collecting container 2. Interrupting the power to the blower then may be scheduled into the interval required for pallet changing.

This procedure offers the advantage that the waste receptacle underneath the suction system can be emptied any time without shutting down the whole equipment. This is unlike conventional suction systems that require such a system shutdown when the waste receptacles are to be emptied or changed. Unlike the case of the state of the art, the waste receptacles of the invention need not be resistant to partial vacuum because they are not subjected to it. Accordingly, pouches and other bags may be used that subsequently only require being easily and reliably closed.

Again,it is highly advantageous in practice that the collecting container 2 may be emptied in an automated, controlled manner, that the applicable centrifugal blowers 5 may be operated at comparatively lower powers and, hence, will generate relatively little noise, and that relatively reliable filtering, for instance of pathogenic germs, is feasible. Opening and closing the closing device can be implemented merely by controlling the operational voltage of the blower 5, and as a result, the control means of the entire automated sample handling apparatus need only provide this function.

An appropriate blower for instance is RG160-28/14N made by Papst GmbH, St. Georgen, Germany.

What is claimed is:

1. A suction device for closures of sample containers, including a suction passage (1), a vacuum space, which constitutes a reservoir (2), and a blower (5) which produces, in use, a vacuum in the reservoir (2), the reservoir (2) having on its underside a closure flap (4) that is mounted with a substantially horizontal pivotal shaft (11) and has a counterweight (13) which is sized so that the closure flap (4) is substantially closed when the reservoir (2) is empty, and the blower is off, so that the closure flap (4) is in a fully closed position when a vacuum is produced in the reservoir, and pivots, when the vacuum drops off, into an open position under a weight of one or more closures.

2. The suction device of claim 1 wherein the closure flap (4) constitutes a chute (7, 9) in its open position, on which the closures fall from the closure flap as a result of their own weight.

3. The suction device of claim 1 wherein the blower (5) is a radial blower.

4. The suction device of claim 1 wherein a filter (3) is arranged between the reservoir (2) and the blower (5), the filter preferably having a pore size which has a separation rate of about 95% at a particle size of 0.2 micrometers.

5. The suction device of claim 4 wherein the filter (3) is a filter cartridge that is inserted on a suction side of the blower (5).

* * * * *